(12) United States Patent
Pattar et al.

(10) Patent No.: US 12,061,812 B2
(45) Date of Patent: Aug. 13, 2024

(54) UNMAPPING LOGICAL BLOCK ADDRESSES OF REMOTE ASYNCHRONOUSLY REPLICATED VOLUMES

(71) Applicant: Dell Products L.P., Hopkinton, MA (US)

(72) Inventors: Guruprasad Pattar, Bangalore (IN); Jeffrey Wilson, Franklin, MA (US); Benjamin Yoder, Chandler, AZ (US)

(73) Assignee: Dell Products L.P., Hopkinton, MA (US)

( * ) Notice: Subject to any disclaimer, the term of this patent is extended or adjusted under 35 U.S.C. 154(b) by 64 days.

(21) Appl. No.: 18/072,080

(22) Filed: Nov. 30, 2022

(65) Prior Publication Data

US 2024/0176528 A1    May 30, 2024

(51) Int. Cl.
*G06F 3/06* (2006.01)
(52) U.S. Cl.
CPC ............ *G06F 3/065* (2013.01); *G06F 3/0604* (2013.01); *G06F 3/0631* (2013.01); *G06F 3/0659* (2013.01); *G06F 3/0689* (2013.01)
(58) Field of Classification Search
CPC ........ G06F 3/067; G06F 3/065; G06F 3/0604; G06F 3/0631; G06F 3/0659; G06F 3/0689; G06F 11/2025–2074; G06F 12/084
See application file for complete search history.

(56) References Cited

U.S. PATENT DOCUMENTS

| | | | |
|---|---|---|---|
| 8,977,826 B1* | 3/2015 | Meiri | G06F 11/2064 |
| | | | 711/159 |
| 10,936,451 B2* | 3/2021 | Tannous | G06F 11/2064 |
| 2012/0054410 A1* | 3/2012 | Vaghani | G06F 3/0664 |
| | | | 711/6 |

* cited by examiner

*Primary Examiner* — Curtis James Kortman
(74) *Attorney, Agent, or Firm* — Anderson Gorecki LLP

(57) ABSTRACT

Unmap extents transmitted in delta sets are used to unmap LBAs on remote replicas of asynchronously replicated storage objects. A host server sends a SCSI unmap command to a production storage array to unmap a range of logical block addresses. In response, the production storage array creates an unmap extent that identifies the local and remote replicas, starting LBA, and number of LBAs to be unmapped. At the end of each asynchronous replication cycle, unmap extents and updated data are sent to a disaster recovery storage array in a delta set that preserves chronological ordering. The disaster recovery storage array receives the delta set and discards cached data corresponding to the unmapped LBAs indicated in the unmap extents and de-allocates the backend storage space. Integrating unmap extents with updated data in delta sets maintains point-in-time consistency and is more efficient than sending zero data.

20 Claims, 5 Drawing Sheets

UNMAPPING LOGICAL BLOCK ADDRESSES OF REMOTE ASYNCHRONOUSLY REPLICATED VOLUMES

TECHNICAL FIELD

The subject matter of this disclosure is generally related to data storage systems.

BACKGROUND

Institutional data storage systems such as storage area networks (SANs) and storage arrays are used to maintain storage objects that contain data used by instances of host applications running on host servers. Examples of host applications may include, but are not limited to, software for email, accounting, manufacturing, inventory control, and a wide variety of other institutional processes. Each storage object is a logical storage device that abstracts the storage space of arrays of disk drives. A separate storage object or group of storage objects may be created to store an image of all data for a single host application.

It is known to configure pairs of storage arrays to maintain replicas of a storage object in order to maintain availability of the host application data and avoid data loss. Production storage objects can be synchronously replicated by primary and secondary storage arrays such that the primary storage array can quickly failover to the secondary storage array. Synchronous replication is done in parallel by both storage arrays. A write IO is only acknowledged to the host-initiator after being committed to memory by both the primary and secondary storage arrays. In order to achieve synchronous replication with low IO latency, high performance components and subsystems may be required. Production storage objects can be asynchronously replicated by a disaster recovery site storage array for use in the event of corruption or loss of the replica at the primary storage array. Asynchronous replication is not done in parallel, so IO latency is less of a concern. Updates to the replica at the primary storage array are accumulated over a predetermined time interval and sent to the disaster recovery storage array in batches according to a schedule.

SUMMARY

A method in accordance with some implementations comprises: a first storage array receiving an unmap command from a host server, the unmap command indicating a range of logical block addresses of a local replica of an asynchronously replicated storage object for which a remote replica exists on a second storage array; creating an unmap extent corresponding to the unmap command; and transmitting the unmap extent from the first storage array to the second storage array with extents of replication data.

An apparatus in accordance with some implementations comprises: a first storage array comprising at least one compute node that manages access to a first array of drives, the first storage array configured to be responsive to receipt of an unmap command from a host server indicating a range of logical block addresses of a local replica of an asynchronously replicated storage object for which a remote replica exists on a second storage array to: create an unmap extent corresponding to the unmap command; and transmit the unmap extent from the first storage array to the second storage array with extents of replication data.

In accordance with some implementations, a non-transitory computer-readable storage medium stores instructions that when executed by a storage array compute node perform a method comprising: receiving an unmap command by a first storage array from a host server, the unmap command indicating a range of logical block addresses of a local replica of an asynchronously replicated storage object for which a remote replica exists on a second storage array; creating an unmap extent corresponding to the unmap command; and transmitting the unmap extent from the first storage array to the second storage array with extents of replication data.

This summary is not intended to limit the scope of the claims or the disclosure. Other aspects, features, and implementations will become apparent in view of the detailed description and figures. Moreover, all the examples, aspects, implementations, and features can be combined in any technically possible way.

DETAILED DESCRIPTION

The terminology used in this disclosure is intended to be interpreted broadly within the limits of subject matter eligibility. The terms "disk," "drive," and "disk drive" are used interchangeably to refer to non-volatile storage media and are not intended to refer to any specific type of non-volatile storage media. The terms "logical" and "virtual" are used to refer to features that are abstractions of other features, for example, and without limitation, abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure.

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e., physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
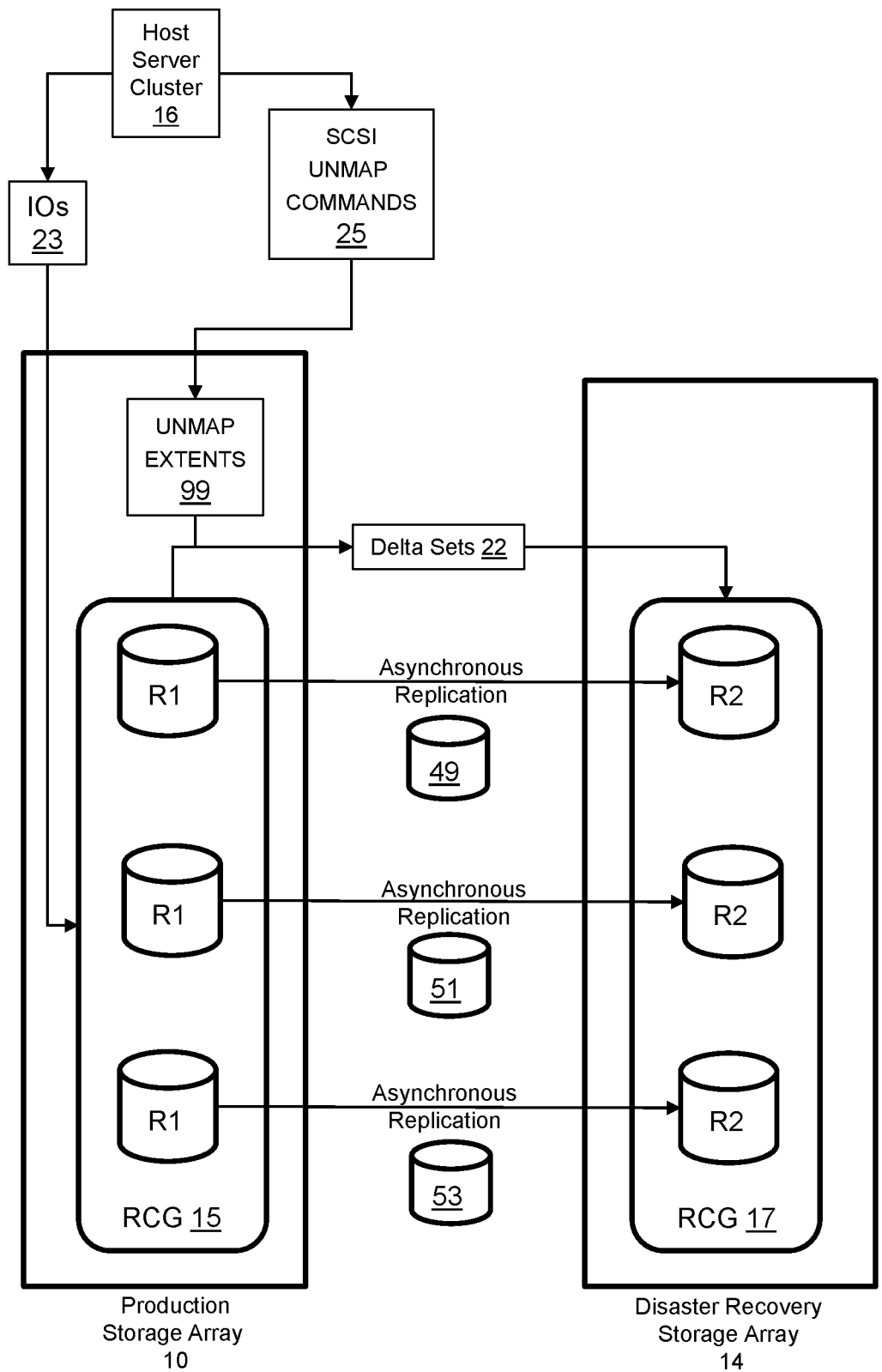
FIG. 1 illustrates a storage system in which unmap extents transmitted in delta sets are used to unmap LBAs on remote replicas of remote asynchronously replicated storage objects.

FIG. 1 illustrates a storage system in which unmap extents 99 transmitted in delta sets 22 are used to unmap logical block addresses (LBAs) on remote replicas of asynchronously replicated storage objects. A primary "production" storage array 10 and a secondary "disaster recovery" storage array 14 are configured to asynchronously replicate production storage objects 49, 51, 53 associated with replication consistency groups 15, 17. A replication consistency group (RCG) is a logical container for a set of storage objects that contain an image of host application data for which updates are applied at the destination only when the destination has a consistent image in the journal. A consistency group ensures that all writes to the local replicas are also written to the remote replicas in correct write-order and in a consistent way, so the remote replica can be used instead of the local replica. The storage objects within the RCG are snapped together so that the entire image can be recovered to the same point in time. Primary replicas R1 of the production storage objects 49, 51, 53 contain host application data that is accessed by instances of a host application running on a cluster 16 of host servers. Secondary replicas R2 of the storage objects are maintained on the disaster recovery site storage array 14. The secondary replicas R2 are updated asynchronously in response to updates to the primary replicas R1. The primary replicas are updated in response to write IOs 23 from the host servers. Updates to the primary replicas R1 are accumulated and periodically sent to the disaster recovery site storage array 14. The updates accumulated over an asynchronous replication period (cycle) are known as a "delta set." Individual updates are represented by deltas that may include a storage object ID, a front-end track (FE-TRK) logical block address (LBA), a timestamp, and the host application data associated with the IOs. Delta sets 22 may be generated and transmitted at fixed time intervals, e.g., every 5 seconds, 10 seconds, 30 seconds, or some other time period. The disaster recovery storage array 14 uses the delta sets 22 received from the primary storage array 10 to maintain the secondary replicas R2.

In addition to read and write IOs, host servers send SCSI unmap commands 25 to the primary storage array. An unmap command specifies a range of LBAs in a replicated storage object to be reclaimed as free space. This happens, for example, when host application data is deleted, or a replicated storage object is formatted. It was previously standard practice to implement the SCSI unmap commands on remote replicas by sending zero data for all unmapped LBAs in the delta sets. Sending zero data in delta sets preserves point-in-time consistency of the RCGs by placing the zero data in time series with any writes to the unmapped blocks, i.e., before and/or after the blocks are unmapped. However, sending zero data for all unmapped LBAs is inefficient because of the amount of data that must be sent. Sending a smaller SCSI unmap command to the disaster recovery site storage array independent of the delta sets would be more efficient but would create a risk of point-in-time inconsistency in the RCGs because the chronological order of implementation of the unmap command would be decoupled from the changes in the delta sets. As will be explained below, a more efficient technique that maintains consistency is to create unmap extents 99 that can be included in the delta sets 22 with data changes.

Figure 2:
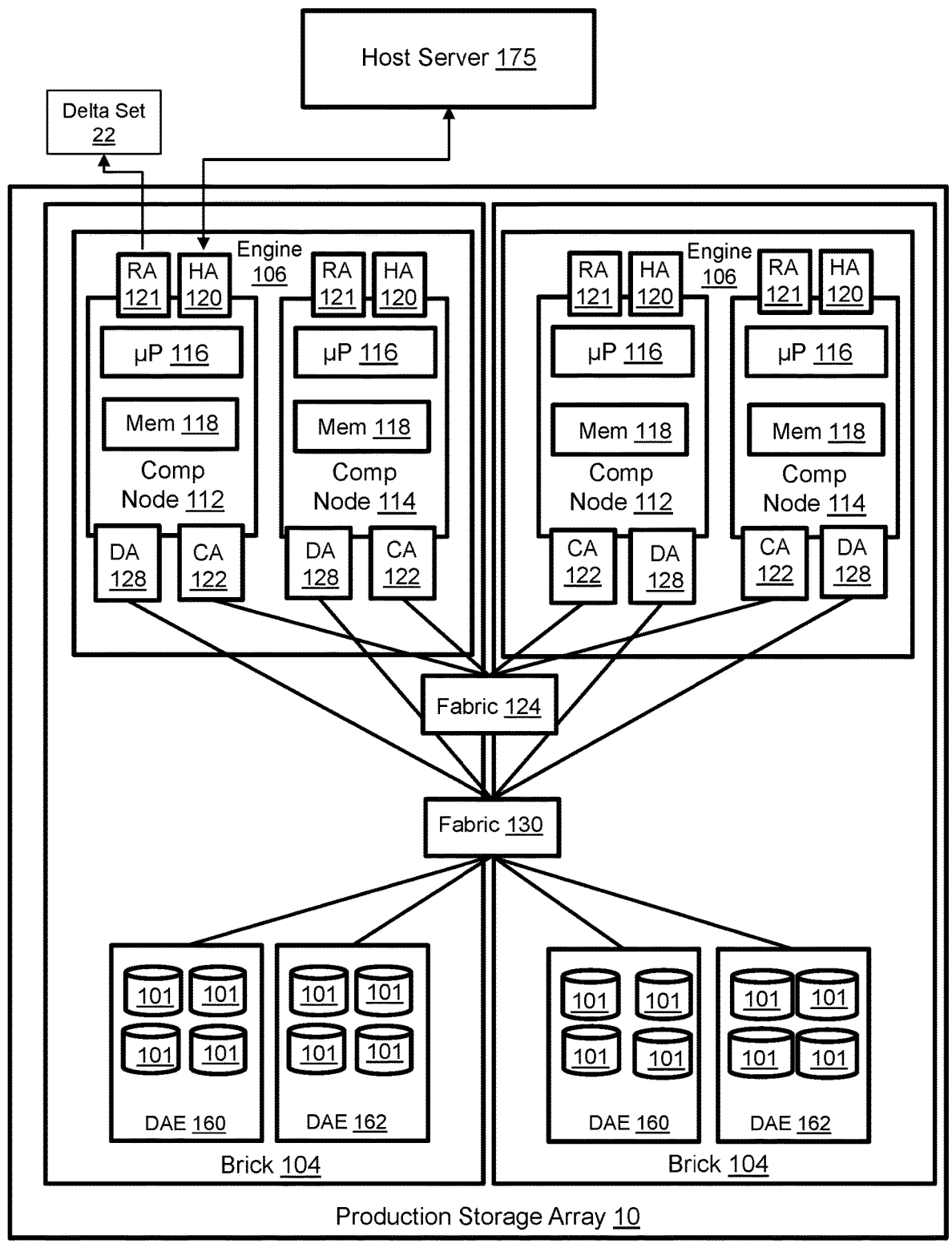
FIG. 2 illustrates the primary storage array in greater detail.

FIG. 2 illustrates the primary storage array 10 in greater detail. Both storage arrays may be substantially similar. The primary storage array includes one or more bricks 104. Each brick 104 includes an engine 106 and one or more disk array enclosures (DAEs) 160, 162. In the illustrated example there are only two engines, but the storage array could include a greater number of engines. Each engine 106 includes two interconnected compute nodes 112, 114 that are arranged as a mirrored pair for failover and may be referred to as "storage directors." Although it is known in the art to refer to the compute nodes of a SAN as "hosts," that naming convention is avoided in this disclosure to help distinguish the network server hosts from the compute nodes 112, 114. Each compute node is implemented as a separate PCB or blade and includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node allocates a portion of its local memory to a shared memory that can be accessed by all compute nodes of the storage array using direct memory access (DMA). Each compute node includes one or more host adapters (HAs) 120 for communicating with host servers such as host server 175. Each host adapter has resources for servicing input-output commands (IOs) from host servers. The host adapter resources may include processors, volatile memory, and ports via which the hosts may access the storage array. Each compute node also includes a remote adapter (RA) 121 for communicating with other storage systems, e.g., the other storage arrays for exchanging delta sets 22 for remote replication. Each compute node also includes one or more disk adapters (DAs) 128 for communicating with managed drives 101 in the DAEs 160, 162. Each disk adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media that may be of any type, e.g., solid-state drives (SSDs) based on EEPROM technology such as NAND and NOR flash memory and hard disk drives (HDDs) with spinning disk magnetic storage media. Disk controllers may be associated with the managed drives as is known in the art. An interconnecting fabric 130 enables implementation of an N-way active-active backend. A backend connection group includes all disk adapters that can access the same drive or drives. In some implementations every disk adapter 128 in the storage array can reach every DAE via the fabric 130. Further, in some implementations every disk adapter in the storage array can access every managed disk 101.

Figure 3:
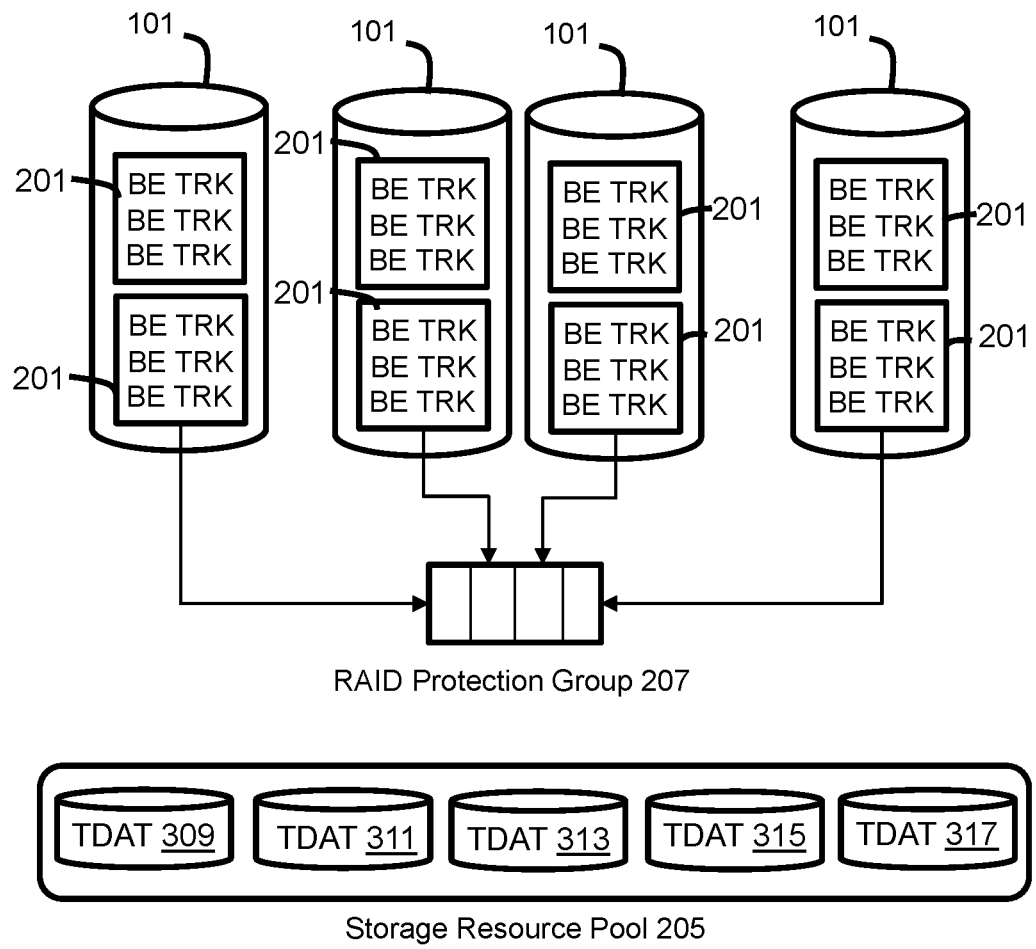
FIG. 3 illustrates layers of abstraction between the managed drives and replicated storage objects.

Referring to FIGS. 2 and 3, the host application data that is logically stored on the primary replicas R1 is persistently stored on the managed drives 101. Without limitation, storage objects such as the primary replicas R1 may be referred to as volumes, devices, or LUNs, where a logical unit number (LUN) is a number used to identify logical storage volumes in accordance with the small computer system interface (SCSI) protocol. From the perspective of the host servers, each production storage object replica is a single disk having a set of contiguous logical block addresses (LBAs) on which data used by the instances of a host application resides. However, the host application data is stored at non-contiguous addresses on various managed drives 101. The RCG 15 of the primary replicas R1 is created for an individual host application. Multiple instances of a single host application may use data from the same RCG, but instances of different host applications do not use data from the same RCG. The storage array may maintain a large number of production storage objects and RCGs.

The compute nodes 112, 114 maintain metadata that maps between the LBAs of the primary replicas R1 and physical addresses on the managed drives 101. The basic allocation unit of storage capacity that is used by the compute nodes 112, 114 to access the managed drives 101 is a back-end track (BE TRK). The managed drives may be configured with partitions or splits 201, each of which may contain multiple BE TRKs. A group of partitions or splits from different managed drives is used to create a RAID protection group 207. A storage resource pool 205 is a storage object that includes a collection of RAID protection groups 207 of the same type, e.g., RAID-5 (3+1). Storage resource pools are used to create the primary replicas R1 of the production storage objects. The host application data is logically stored in front-end tracks (FE TRKs) on the primary replicas. The FE TRKs are mapped to the BE TRKs and vice versa by metadata known as track IDs (TIDs), which are pointers that are maintained in the shared memory.

Figure 4:
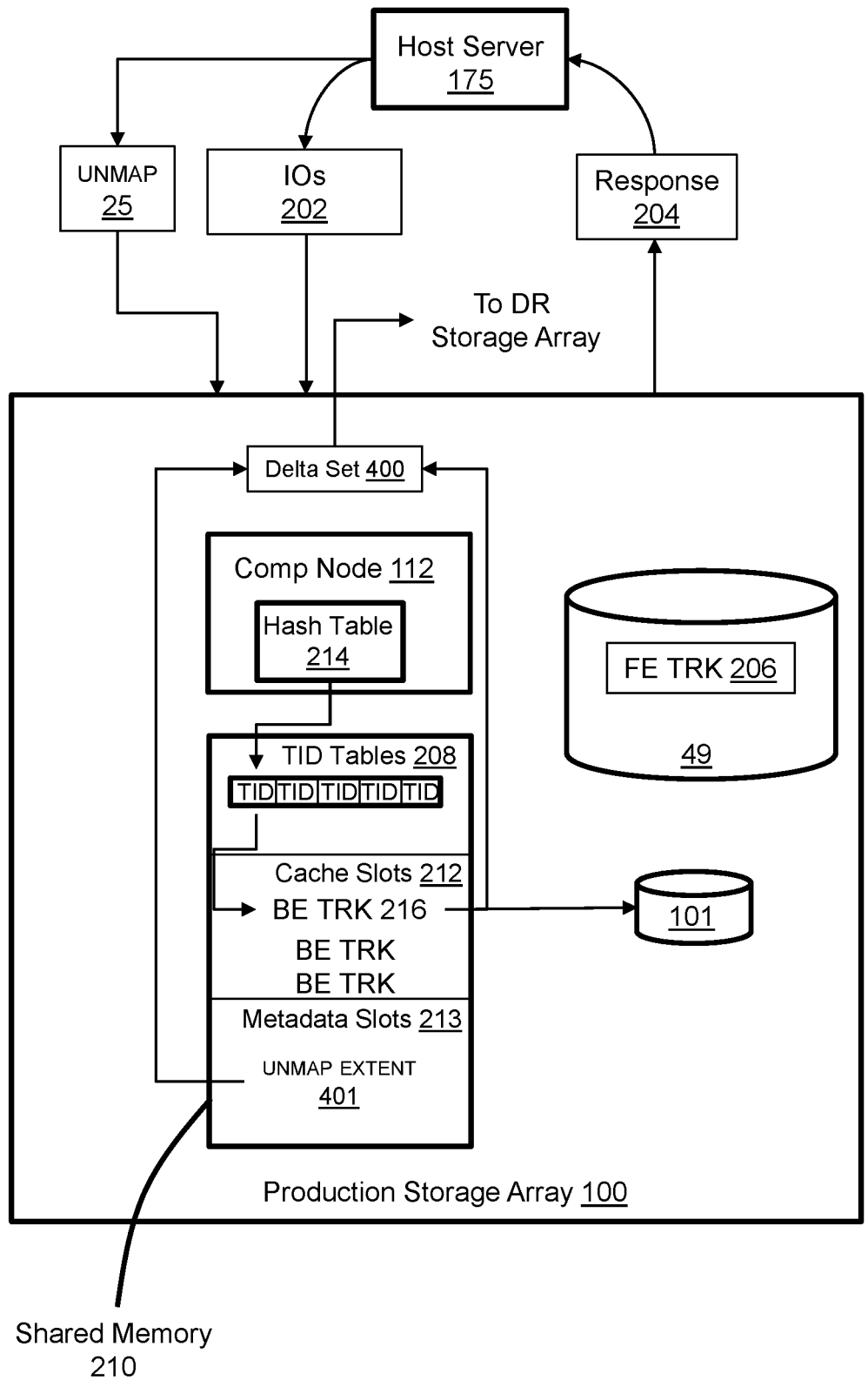
FIG. 4 illustrates how shared memory is used to service IOs and process SCSI unmap commands.

FIG. 4 illustrates how the shared memory 210 is used to service IOs 202 and process SCSI unmap commands 25. An IO may be a Write command or a Read command. A response 204 to an IO 202 is an Ack in the case of a Write command or unmap command and data in the case of a Read command. For purposes of explanation the IO 202 is a Write to a FE TRK 206 that is logically stored on production volume 49. TID tables 208 are a first portion of the shared memory that is allocated for TIDs. Cache slots 212 are a second portion of the shared memory that is allocated for host application data, i.e., BE TRKs. Metadata slots 213 are a third portion of the shared memory that is allocated for unmap extents. The TIDs contain pointers that map FE TRKs in storage objects to BE TRKs in the cache slots and managed drives. In response to IO 202, the compute node 112 identifies the TID corresponding to FE TRK 206 by inputting information such as the device number, cylinder number, head (track) and size obtained from the IO 202 into a hash table 214. The hash table 214 indicates the location of the TID in the TID tables 208. The TID is obtained from the TID tables and used by the compute node 200 to find BE TRK 216 in the cache slots 212. If BE TRK 216 is not in the cache slots 212, then a free cache slot is allocated. The Write data associated with the IO is written to the identified/allocated BE TRK in the cache slots and the TID is updated. An Ack is then returned to the host server. The BE TRK data in the cache slots is eventually added to a delta set 400 and destaged to the managed drives 101, e.g., overwriting the stale copy on the managed drives.

In response to receipt of a SCSI unmap command 25, the compute node 112 identifies the storage object 49 and FE TRK LBAs to be unmapped from the unmap command. The compute node then generates a corresponding unmap extent 401 that is written to the metadata slots 212. Each unmap extent includes metadata such as a primary replica number, secondary replica number, starting track (256 LBA aligned unit), and number of tracks to be unmapped, thereby indicating the range of LBAs to be unmapped from a remote replica of a particular asynchronously replicated storage object. The unmap extents from the metadata slots and updated data from the cache slots are added to delta set 400, which is transmitted to the disaster recovery storage array at the end of the asynchronous replication cycle. The metadata slots on the primary storage array are then freed and any unmapped data remaining in the cache slots is discarded and those cache slots are freed. The corresponding TIDs are updated to indicate that the storage space is available. The disaster recovery storage array is configured responsive to receipt of the delta set to discard the cache slot data of unmapped tracks and update the corresponding TIDs to indicate that the storage space is free. Because an unmap extent is smaller than the data being unmapped, efficiency is improved over sending zero data for unmapped LBAs. Further, point-in-time consistency is maintained because the unmap extents are included in the delta set, which includes chronological ordering, e.g., timestamps. Efficiency may be further enhanced by excluding same-cycle write data to unmapped extents from the delta set, provided that the same-cycle write was received before the unmap command. A same-cycle write that was received after the unmap command is included in the delta set.

Figure 5:
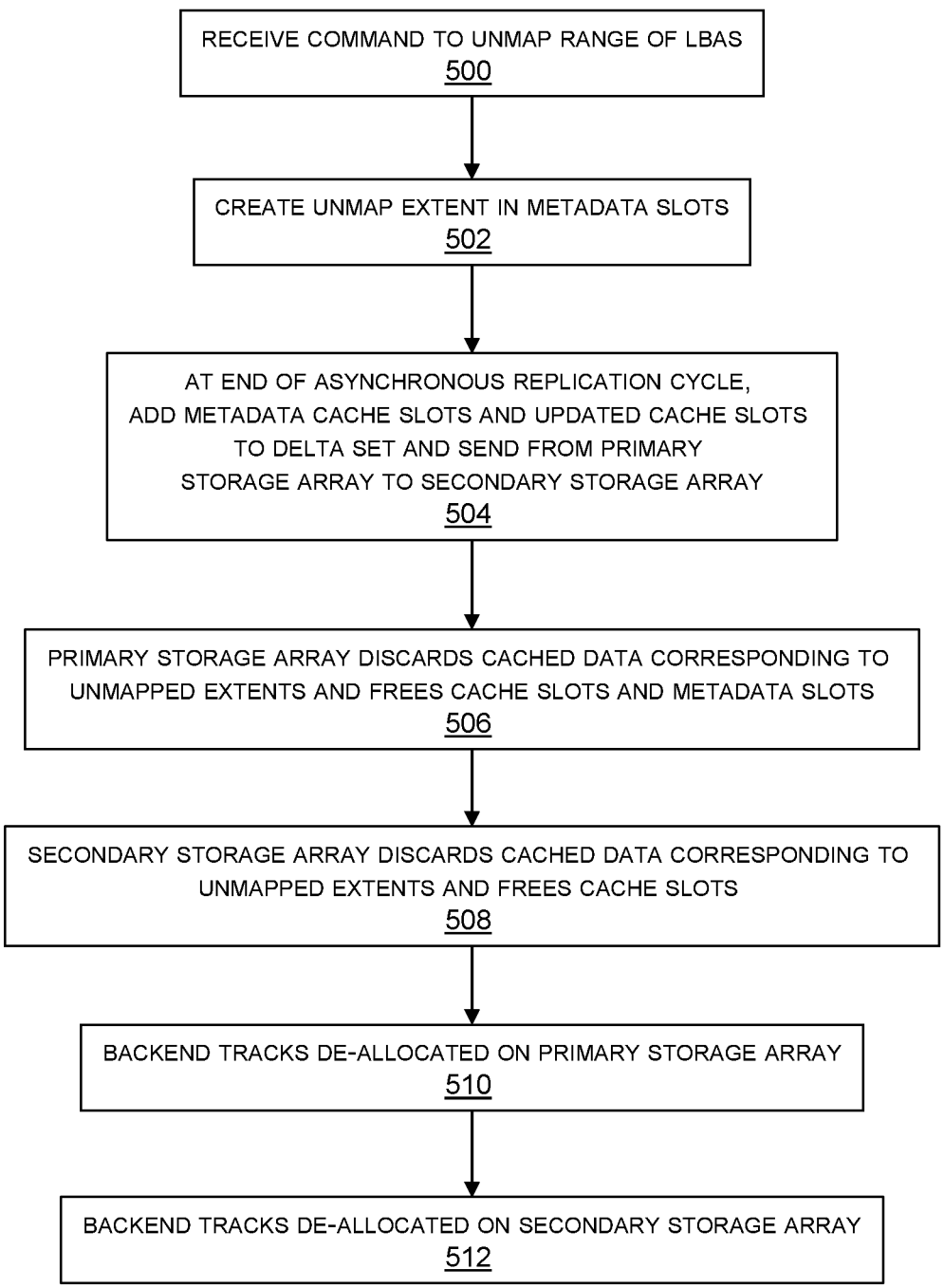
FIG. 5 illustrates a method for unmapping LBAs of remote asynchronously replicated storage objects.

FIG. 5 illustrates a method for unmapping LBAs of remote replicas of asynchronously replicated storage objects. In step 500 a primary storage array receives a SCSI unmap command to unmap a range of LBAs from a replicated storage object. Step 502 is creating a corresponding unmap extent and copying it into a metadata slot. The unmap extents in the metadata slots and updated data in the cache slots are added to a delta set and sent from a primary storage array to a secondary storage array at the end of the asynchronous replication cycle as indicated in step 504. The primary storage array discards any remaining cache slot data corresponding to unmapped LBAs and frees the corresponding metadata slots and cache slots as indicated in step 506. The secondary storage array responds to the delta set by discarding cache slot data corresponding to unmapped LBAs and frees the corresponding cache slots as indicated in step 508. The primary storage array updates the TIDs and de-allocates the corresponding back-end tracks from storage as indicated in step 510. The secondary storage array updates the TIDs and de-allocates the corresponding back-end tracks from storage as indicated in step 512.

If a SCSI unmap command for a track is received after a write IO to the same track in the same asynchronous replication cycle, then the cache slot is freed, and the write data is not included in the delta set. The TID association is removed, the cache slot is freed, and the unmap extent for the track is included in the delta set. However, a write IO to the same track received after the SCSI unmap command is written to the cache slots and included in the delta set. The unmap extent information is kept as is, but a new cache slot is allocated, a TID association is created, and the cache slot data is added to the delta set for the cycle. The delta set could include only cache slots, only metadata slots, or a mix of both. On the Secondary side the unmap extent slot is processed first and then any data slot in the cycle is processed to maintain consistency.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
a first storage array receiving an unmap command from a host server, wherein the unmap command indicates a range of logical block addresses of a local replica of an asynchronously replicated storage object for which a remote replica exists on a second storage array; and
replicating effects of the unmap command on the local replica to the remote replica without sending zero data or the unmap command by:
creating, in metadata slots of the first storage array, an unmap extent corresponding to the unmap command, wherein the unmap extent identifies the range of logical block addresses as being free space; and
transmitting, with extents of replication data and in at least one delta set with chronological ordering, the unmap extent from the first storage array to the second storage array, prompting replication of the unmap extent in metadata slots of the second storage array, wherein the replication of the unmap extent in the metadata slots of the second storage array unmaps the logical block addresses of the remote replica by identifying the range of logical block addresses as being free space.

2. The method of claim 1 further comprising writing the unmap extent to a metadata slots portion of shared memory allocated for unmap extents.

3. The method of claim 2 further comprising adding the unmap extent and updated cache slot data to a delta set associated with a replication cycle.

4. The method of claim 3 further comprising the first storage array discarding data in cache slots corresponding to the logical block addresses.

5. The method of claim 4 further comprising the second storage array discarding data in cache slots corresponding to the logical block addresses responsive to receipt of the unmap extent.

6. The method of claim 5 further comprising the first storage array de-allocating backend tracks corresponding to the logical block addresses from storage.

7. The method of claim 6 further comprising the second storage array de-allocating backend tracks corresponding to the logical block addresses from storage responsive to receipt of the unmap extent.

8. An apparatus comprising:
a first storage array comprising at least one compute node that manages access to a first array of drives, wherein the first storage array is configured to be responsive to receipt of an unmap command from a host server indicating a range of logical block addresses of a local replica of an asynchronously replicated storage object for which a remote replica exists on a second storage array to:
create, in metadata slots of the first storage array, an unmap extent corresponding to the unmap command, wherein the unmap extent identifies the range of logical block addresses as being free space; and
transmit, with extents of replication data and in at least one delta set with chronological ordering, the unmap extent from the first storage array to the second storage array, prompting replication of the unmap extent in metadata slots of the second storage array, wherein the replication of the unmap extent in the metadata slots of the second storage array unmaps the logical block addresses of the remote replica by identifying the range of logical block addresses as being free space, thereby replicating effects of the unmap command on the local replica to the remote replica without sending zero data or the unmap command.

9. The apparatus of claim 8 further comprising the first storage array configured to write the unmap extent to a metadata slots portion of shared memory allocated for unmap extents.

10. The apparatus of claim 9 further comprising the first storage array configured to add the unmap extent and updated cache slot data to a delta set associated with a replication cycle.

11. The apparatus of claim 10 further comprising the first storage array configured to discard data in cache slots corresponding to the logical block addresses.

12. The apparatus of claim 11 further comprising the second storage array configured to discard data in cache slots corresponding to the logical block addresses responsive to receipt of the unmap extent.

13. The apparatus of claim 12 further comprising the first storage array configured to de-allocate backend tracks corresponding to the logical block addresses from storage.

14. The apparatus of claim 13 further comprising the second storage array configured to de-allocate backend tracks corresponding to the logical block addresses from storage responsive to receipt of the unmap extent.

15. A non-transitory computer-readable storage medium storing instructions that when executed by compute nodes in a storage system perform a method comprising:
receiving an unmap command by a first storage array from a host server, wherein the unmap command indicates a range of logical block addresses of a local replica of an asynchronously replicated storage object for which a remote replica exists on a second storage array; and
replicating effects of the unmap command on the local replica to the remote replica without sending zero data or the unmap command by:
creating, in metadata slots of the first storage array, an unmap extent corresponding to the unmap command, wherein the unmap extent identifies the range of logical block addresses as being free space; and
transmitting, with extents of replication data and in at least one delta set with chronological ordering, the unmap extent from the first storage array to the second storage array, prompting replication of the unmap extent in metadata slots of the second storage array, wherein the replication of the unmap extent in metadata slots of the second storage array unmaps the logical block addresses of the remote replica by identifying the range of logical block addresses as being free space.

16. The non-transitory computer-readable storage medium of claim 15 in which the method further comprises writing the unmap extent to a metadata slots portion of shared memory of the first storage array allocated for unmap extents.

17. The non-transitory computer-readable storage medium of claim 16 in which the method further comprises adding the unmap extent and updated cache slot data to a delta set associated with a replication cycle.

18. The non-transitory computer-readable storage medium of claim 17 in which the method further comprises the first storage array discarding data in cache slots corresponding to the logical block addresses.

19. The non-transitory computer-readable storage medium of claim 18 in which the method further comprises the second storage array discarding data in cache slots corresponding to the logical block addresses responsive to receipt of the unmap extent.

20. The non-transitory computer-readable storage medium of claim 19 in which the method further comprises the first storage array de-allocating backend tracks corresponding to the logical block addresses from storage and the second storage array de-allocating backend tracks corresponding to the logical block addresses from storage responsive to receipt of the unmap extent.

* * * * *